US012759056B2

(12) United States Patent
Johansson et al.

(10) Patent No.: US 12,759,056 B2
(45) Date of Patent: Oct. 13, 2026

(54) METAL CUTTING TURNING TOOL

(71) Applicant: AB SANDVIK COROMANT, Sandviken (SE)

(72) Inventors: Adam Johansson, Sandviken (SE); Ronnie Lof, Sandviken (SE); Krister Wikblad, Sandviken (SE)

(73) Assignee: AB Sandvik Coromant, Sandviken (SE)

( * ) Notice: Subject to any disclaimer, the term of this patent is extended or adjusted under 35 U.S.C. 154(b) by 546 days.

(21) Appl. No.: 18/267,190

(22) PCT Filed: Nov. 3, 2021

(86) PCT No.: PCT/EP2021/080445
§ 371 (c)(1),
(2) Date: Jun. 14, 2023

(87) PCT Pub. No.: WO2022/128236
PCT Pub. Date: Jun. 23, 2022

(65) Prior Publication Data

US 2024/0051034 A1 Feb. 15, 2024

(30) Foreign Application Priority Data

Dec. 15, 2020 (EP) .................................... 20214122

(51) Int. Cl.
*B23B 27/16* (2006.01)
*B23B 1/00* (2006.01)

(52) U.S. Cl.
CPC ................ *B23B 27/16* (2013.01); *B23B 1/00* (2013.01)

(58) Field of Classification Search
CPC .. B23B 1/00; B23B 3/26; B23B 3/265; B23B 3/36; B23B 29/043; B23B 29/04; B23B 2210/02; B23B 2220/12; B23B 2220/00; B23B 2220/44; B23B 2220/445; B23B 2220/40; B23B 2200/048;
(Continued)

(56) References Cited

U.S. PATENT DOCUMENTS 3,078,547 A * 2/1963 Sweet .................. B23B 29/248 407/68
3,128,657 A * 4/1964 Hebert .................. B23Q 35/18 82/12
(Continued)

FOREIGN PATENT DOCUMENTS

EP 0162029 A2 * 11/1985 .......... B23B 27/145
EP 1317981 A1 6/2003
(Continued)

*Primary Examiner* — Nicole N Ramos
(74) *Attorney, Agent, or Firm* — Corinne R. Gorski

(57) ABSTRACT

A turning tool includes a coupling portion, which extends along a coupling axis, the coupling axis defining a longitudinal axis of the turning tool. The turning tool includes a first cutting element and a second cutting element, wherein the first cutting element has a first cutting edge. The second cutting element has a second nose cutting edge separating and connecting a second forward cutting edge and a second rearward cutting edge. The first cutting element includes a first top surface, and the second cutting element includes a second top surface. A first top surface and the second top surface face in the same or substantially the same direction.

15 Claims, 5 Drawing Sheets

(58) Field of Classification Search
CPC ...... B23B 2200/0495; B23B 2200/049; B23B 2270/54
See application file for complete search history.

(56) References Cited

U.S. PATENT DOCUMENTS 4,510,829 A * 4/1985 Kintzel ................... B23B 29/04 82/158
7,311,478 B2 * 12/2007 Erickson ............... B23B 29/242 407/46
10,493,534 B2 * 12/2019 Klose ....................... B23Q 1/64
2002/0170396 A1 * 11/2002 Maier ..................... B23B 29/24 82/159
2009/0060665 A1 * 3/2009 Lof ....................... B23B 27/145 407/116
2009/0182451 A1 * 7/2009 Jennessen ........ G05B 19/40938 82/118
2012/0051855 A1 * 3/2012 Lof ....................... B23B 27/143 407/114
2014/0251096 A1 9/2014 Hankey
2014/0286717 A1 * 9/2014 Lof ....................... B23B 27/143 407/115
2014/0286718 A1 * 9/2014 Scherman ............. B23B 27/143 407/114
2015/0003923 A1 * 1/2015 Selin ..................... B23B 27/143 407/115
2016/0274560 A1 9/2016 Nakajima
2017/0100777 A1 * 4/2017 Lof ....................... B23B 27/164
2017/0100778 A1 * 4/2017 Lof ........................... B23B 1/00
2017/0320143 A1 * 11/2017 Lof ....................... B23B 27/145
2020/0290133 A1 9/2020 Embretsen et al.
2020/0324345 A1 * 10/2020 Maier ....................... B23B 1/00
2020/0338645 A1 10/2020 Moroguchi et al.
2020/0346288 A1 * 11/2020 Johansson ............. B23B 27/141
2021/0008635 A1 * 1/2021 Stjernstedt ................ B23B 1/00
2021/0039173 A1 * 2/2021 Lof ......................... B23B 27/10
2021/0237167 A1 * 8/2021 Johansson ................. B23B 1/00
2022/0347760 A1 * 11/2022 Johansson ............. B23B 27/145
2024/0051034 A1 * 2/2024 Johansson ............... B23B 29/24
2024/0051035 A1 * 2/2024 Johansson ............... B23B 27/16
2024/0058871 A1 * 2/2024 Johansson ............... B23B 29/24

FOREIGN PATENT DOCUMENTS

EP 3025812 A1 * 6/2016 ............... B23C 3/34
EP 3153257 A1 * 4/2017 ............... B23B 1/00
EP 3536425 A1 * 9/2019 ......... B23B 27/1611
EP 3536428 A1 * 9/2019 ............. B23B 27/16
EP 3560638 A1 10/2019
JP H0890303 A 4/1996
WO 2004022288 A2 3/2004

* cited by examiner

METAL CUTTING TURNING TOOL

RELATED APPLICATION DATA

This application is a § 371 National Stage Application of PCT International Application No. PCT/EP2021/080445 filed Nov. 3, 2021 with priority to EP 20214122.2 filed Dec. 15, 2020.

TECHNICAL FIELD OF THE INVENTION

The present invention belongs to the technical field of metal cutting. More specifically the present invention belongs to the field of turning.

BACKGROUND OF THE INVENTION AND PRIOR ART

The present invention relates to a turning tool comprising a coupling portion, wherein the coupling portion extends along a coupling axis, where the coupling axis defines a longitudinal axis of the turning tool, wherein the turning tool comprises a first cutting element and a second cutting element, wherein the first cutting element comprises a first cutting edge, wherein the second cutting element comprises a second nose cutting edge separating and connecting a second forward cutting edge and a second rearward cutting edge, wherein the first cutting element comprises a first top surface, wherein the second cutting element comprises a second top surface.

In a further aspect, the present invention relates to a machining method for a CNC-lathe.

In metal cutting, turning is a common operation. CNC-lathes are commonly used. Normally, a complex shaped is machined from a metal work piece. To achieve the complex shape, it is common to use two or more turning tools, where the turning tools have different geometrical shape or different orientation. For example, one turning tool can be suitable in machining in one direction, and a second turning tool can be suitable to machining in a different direction.

Conventionally, each turning tool is equipped with one turning insert. After turning using one turning insert, normally the first turning tool is indexed to a second turning tool. For example, the CNC-lathe may comprise a turret, and the indexing from one turning tool to a second turning tool is achieved by rotation of the turret by a predetermined angle. Indexing by rotation of a turret takes time, depending e.g. on the CNC-lathe. The time where there is no cutting, such as when changing or indexing from one tool to another can be called down-time.

EP 1 317 981 A1 disclose a tool carrying a plurality of turning inserts, whereby switching between different turning inserts can be achieved quickly, by means of rotation of the turning tool around a coupling axis.

The inventors have found that there is a need for a further improved turning tool.

SUMMARY OF THE INVENTION

It is an object of the invention to provide a turning tool which suitable for machining an object having a complex shape. It is further an object to provide a turning tool which can be used on a wide range of CNC-lathes. A still further object is to provide a turning tool which can be used for a long time of machine. It is a yet further object to provide a turning tool which can help reduce the down-time.

At least one of said objectives is achieved by the initially defined turning tool, where the first top surface and the second top surface are facing in the same or substantially the same direction.

By such a turning tool, change or indexing from a first cutting element to a second cutting element can be quickly achieved through a movement of the turning tool along the Y-axis of the CNC-lathe to which the turning tool is connectable.

The turning tool is for a CNC-lathe i.e. a computer- or computerized numerical control lathe, i.e. any CNC-machine suitable for turning such as e.g. a turning lathe, a multitask machine, a turn-mill machine, or a sliding head machine. The turning tool is for machining a metal work piece, such as a metal work piece comprises an external surface, which is a radially outer surface, where the radially outer surface is facing away from a rotational axis around which the metal work piece is rotatable. The turning tool is for turning of said radially outer surface, i.e. external turning.

The turning tool comprises a forward end and an opposite rear end in the form of a coupling portion. The coupling portion is removably connectable to the CNC-lathe, more specifically to a machine interface of the CNC-lathe, such as a machine spindle or a tool revolver turret or a tool post.

The coupling portion may have a square or rectangular shape in a cross section. The coupling portion may be conical or substantially conical such as preferably according to ISO standard 26623-1. The coupling portion extends along a coupling axis or a center axis, which center axis defines a longitudinal axis of the turning tool.

The turning tool (1) comprises a first cutting element (7) and a second cutting element (8). The first and second cutting elements are spaced apart. The first and second cutting elements are preferably cutting inserts or turning inserts, i.e. replaceable elements made from a wear resistant material, e.g. cemented carbide. Alternatively, the first and second cutting elements can be parts of a single wear resistant element, preferably made from a single piece of cemented carbide. The first cutting element comprises a first top surface. The first top surface comprises a rake face or a rake surface.

The first cutting element comprises a first cutting edge. The first cutting edge comprises at least a portion which is convex in a top view. The nose cutting edge, or a portion of the nose cutting edge, generate the machined surface. The first cutting element may be in the form of a round cutting insert, i.e. an insert which is circular or substantially circular in a top view. The radius of said circle is preferably 5-30 mm. Alternatively, the first cutting edge may be in the form of a first nose cutting edge, which is convex in a top view, preferably in the form of a circular arc, having a radius of curvature of 0.2-1.6 mm, and be arranged between, i.e. connecting, a first forward cutting edge, i.e. a main cutting edge or a principal cutting edge or a leading cutting edge, and a first rearward cutting edge, i.e. an auxiliary cutting edge or a trailing cutting edge.

The first top surface may in a top-view have a rhomb-shape, a triangular shape, a square shape, a round shape, or a polygon shape.

The first top surface and the second top surface may each be flat. Alternatively, one or both of said surfaces may be non-flat or non-planar. Preferably, said surfaces may comprise one or more chip breaking means, in the form of one or more protrusions and/or depressions.

The direction which the first top surface is facing is a normal to the first top surface, i.e. a direction perpendicular to the first top surface. Said direction is away from the first top surface, and away from the first bottom surface, in case the first cutting element is in the form of a cutting insert or a turning insert, having a first bottom surface.

In case the first top surface is non-flat, for the purpose of determine the direction which the first top surface is facing, such first top surface may be defined as or approximated to a plane parallel to a first mid-plane, where said plane intersects the first nose cutting edge, or at least a portion of the first nose cutting edge. Said first mid-plane is a plane mid-way between the first top surface and the first bottom surface, in case the first cutting element is in the form of a cutting insert or a turning insert, having a first bottom surface.

Alternatively said first top surface, for the purpose of determine the direction which the first top surface is facing, may be defined as a plane intersecting all nose cutting edges bordering to or adjoining the first top surface.

A corresponding reasoning applies for the second top surface and the second cutting element.

The second cutting element comprises a second nose cutting edge separating and connecting a second forward cutting edge and a second rearward cutting edge. The second cutting element comprises a first top surface. The second top surface comprises a rake face or a rake surface. The second forward cutting edge is a leading cutting edge. The second rearward cutting edge is a trailing cutting edge.

The first cutting element is preferably in the form of a first cutting insert, which comprises a first top surface and an opposite first bottom surface, wherein the first top surface comprises the first rake face: Preferably the second cutting element is preferably in the form of a second cutting insert, which comprises a second top surface and an opposite second bottom surface, wherein the second top surface comprises the second rake face. The first bottom surface is facing the second top surface.

The first rake face is associated with the first nose cutting edge and the second rake face is associated with the second cutting edges.

The first bottom surface and the second bottom surface are in parallel planes or substantially parallel planes.

A first top surface and the second top surface are facing in the same or substantially the same direction, preferably in a direction which is perpendicular or substantially perpendicular to the coupling axis, or perpendicular or substantially perpendicular to a line which is parallel to the coupling axis.

Preferably, in a top view, where the first and second rake faces towards the viewer, a distance from the coupling axis to the first nose cutting edge is shorter than a distance from the coupling axis to the second nose cutting edge.

The turning tool is suitable for external turning of a cylindrical metal work piece, such as preferably longitudinal turning. The first and second cutting elements can be alternatively used for longitudinal turning of a metal work piece, which rotates in one direction around a rotational axis thereof.

According to an embodiment, the first cutting element comprises a first forward cutting edge and a first rearward cutting edge, wherein the first cutting edge is in the form of a first nose cutting edge, wherein the first nose cutting edge separates and connects the first forward cutting edge and the first rearward cutting edge.

By such a turning tool, more complex shapes can be machined. For example, a groove may be machined. Preferably, in a top view the first forward cutting edge and the second forward cutting edge forms an angle 90-174° in relation to each other. Even more preferably, said angle is 95-140°.

Preferably in a top view, the first forward cutting edge and the second forward cutting edge are angled or inclined in opposite directions relative to the coupling axis. Formulated differently, in a top view, one of the first forward cutting edge and the second forward cutting edge are angled at a positive angle while the other is angled at a negative angle, in relation to a line parallel to the coupling axis extending mid-way between the first and second nose cutting edges.

More specifically, in a top view and in relation to a line parallel to the coupling axis extending mid-way between the first and second nose cutting edges, the first forward cutting edge forms an first forward angle of preferably 3-45°, and the second forward cutting edge forms a second forward angle of preferably −3-−45°. The first and second cutting elements are oriented such that in a top view, i.e. where the first and second rake faces are towards the viewer, the first forward cutting edge and the second forward cutting edge diverge in a forward direction and converge in a rearward direction, where forward and rearward are defined by the coupling axis, where the coupling portion defines a rearward direction.

In a top view, a line coinciding with the first forward cutting edge intersects a line coinciding with the second forward cutting edge at an intersection point or vertex, wherein along the coupling axis, measured along a line parallel to the coupling axis, a distance from the coupling portion to the first nose cutting edge is greater than a distance from the coupling portion to said intersection point or vertex. In other words, said intersection point or vertex is located rearward in comparison to the first nose cutting edge.

Preferably, the first cutting element is arranged such that when turning in a first direction perpendicular to the coupling axis, the first forward cutting edge forms a first entering angle of 3-45°, wherein the second cutting element is arranged such that when turning in a second direction, opposite to the first direction (and preferably perpendicular to the coupling axis), the second forward cutting edge forms a second entering angle of 3-45°.

The first forward cutting edge is thus arranged to or suitable to be active at an acute entering angle when turning in a first direction perpendicular to the coupling axis, wherein the second forward cutting edge is arranged to be active at an acute entering angle when turning in a second direction, where said second direction is in an opposite direction to said first direction.

According to an embodiment, in a top view, a first bisector between the first forward cutting edge and the first rearward cutting edge forms an angle of 45-90° in relation to a second bisector between the second forward cutting edge and the second rearward cutting edge.

By such a turning tool, more complex shapes can be machined with the turning tool.

A top view is where the first top surface is facing the viewer.

According to an embodiment, in a top view the first rearward cutting edge and the second rearward cutting edge forms an angle of 6-20° in relation to each other.

By such a turning tool, more complex shapes can be machined. By such a turning tool, more feed directions are possible.

More precisely, a line which in a top view coincides with the first rearward cutting edge forms an angle of 6-20° in relation to a line which in a top view coincides with the second rearward cutting edge.

According to an embodiment, a distance from the first forward cutting edge to the second forward cutting edge is shorter than a distance from the first forward cutting edge to the second rearward cutting edge.

By such a turning tool, more complex shapes can be machined. By such a turning tool, the first cutting element can be used in one feed direction and the second cutting element can be used in an opposite feed direction.

Said distances are measured in a top view, along a line perpendicular to the coupling axis.

According to an embodiment, a first nose angle defined as an angle between the first forward cutting edge and the first rearward cutting edge is acute.

By such a turning tool, more complex shapes can be machined.

Preferably, said nose angle is 25-80°, even more preferably 30-60°. The first nose angle is seen in top surface.

According to an embodiment, a second nose angle defined as an angle between the second forward cutting edge and the second rearward cutting edge is acute.

By such a turning tool, more complex shapes can be machined.

Preferably, said second nose angle is 25-80°, even more preferably 30-60°. The second nose angle is in a top view.

According to an embodiment, the first nose cutting edge and the second nose cutting edge are longitudinally at an equal or substantially equal distances.

By such a turning tool, less movement is needed when indexing from the first cutting element to the second cutting element. Longitudinally measured from the coupling portion along lines parallel to the coupling axis. Substantially equal distance means within 5 mm, preferably within 2 mm. In case said distances are not equal but substantially equal, i.e. within 5 mm, preferably the first nose cutting edge is at a greater distance from coupling portion.

According to an embodiment, the first nose cutting edge and/or the second nose cutting edge is the longitudinally most distal part of the turning tool.

In other words, the first and/or second nose cutting edge is the longitudinally most forward part of the turning tool, where the coupling axis is a longitudinal axis, and the coupling portion defines the rearward direction or rear end.

According to an embodiment, the first cutting element is in the form of a first turning insert, wherein the second cutting element is in the form of a second turning insert, wherein the first turning insert comprises the first nose cutting edge, wherein the second turning insert comprises the second nose cutting edge, the second forward cutting edge and the second rearward cutting edge.

Preferably, the first turning insert comprises the first forward cutting edge and the first rearward cutting edge.

According to an embodiment, the first turning insert comprises a first top surface and an opposite first bottom surface, wherein a first mid-plane extends substantially mid-way between the first top surface and the first bottom surface, wherein the second turning insert comprises a second top surface and an opposite second bottom surface, wherein a second mid-plane extends substantially mid-way between the second top surface and the second bottom surface, wherein the first mid-plane and the second mid-plane extends in parallel or substantially parallel planes.

According to an embodiment, in a top view the first turning insert and the second turning insert partially overlap.

The first turning insert and the second turning insert overlap partially but not completely.

According to an embodiment, the turning tool comprises a third cutting element.

The third cutting element is preferably in the form of a third cutting insert. Preferably the shape of the third turning insert in a top view differs from the shape of the first and second turning inserts.

Preferably, in a top view, the first, second and third cutting elements partially overlap.

Preferably, the turning tool comprises a third protruding portion, wherein the third protruding portion comprises the third cutting element.

According to an embodiment, the coupling portion is square or rectangular in a cross section or comprises a conical or substantially conical portion.

Said cross section is in a plane perpendicular to the coupling axis.

The coupling portion preferably comprise a conical or substantially conical portion and a ring-shaped portion, such as preferably in the form of a polygonal hollow taper interface with a flange contact surface, such in accordance to ISO 26623-1:2014, or a hollow taper with a flange contact surface such as in accordance to DIN 69893, ISO 12164-1 or ISO 12164-1F.

According to an embodiment, a turning method for a CNC-lathe, comprises the steps of providing a metal work piece, providing a turning tool according to any of the above described embodiments, rotating the metal work piece in one direction around a rotational axis thereof; turning in a first direction such that the first nose cutting edge is in cut, moving the turning tool in a direction such that the first nose cutting edge is moved away from the metal work piece and such that the second nose cutting edge is moved towards the metal work piece, moving the turning tool in a second direction such that the second forward cutting edge is active at a second entering angle which is 5-45°, wherein the second direction is in the opposite direction or substantially opposite direction to the first direction.

The turning method is for a CNC-lathe i.e. a computer- or computerized numerical control lathe, i.e. any CNC-machine suitable for turning such as e.g. a turning lathe, a multitask machine, a turn-mill machine, or a sliding head machine. A metal work piece is provided.

The metal work piece comprises an external surface, which is a radially outer surface. The radially outer surface is facing away from the rotational axis. The turning method is for turning of the radially outer surface, i.e. external turning. The metal work piece extends between a first end and a second end. The metal work piece is clamped by clamping means. The clamping means holds the metal work piece and are at least partially controlled and driven by a mo-tor or a spindle.

The clamping means may be in the form of a collet chuck, a face driver, a 3-jaw chuck, and may comprise a tail stock. The headstock end of the machine is preferably located at the first end of the metal work piece. A second end of the metal work piece, opposite to the first end of the work piece, may be a free end. Alternatively, the second end is in contact with a tailstock.

The method comprises the step of rotating the metal work piece in one direction around a rotational axis thereof. The one direction may be clock-wise or counter clock-wise.

The method preferably comprises the step of setting the coupling axis perpendicular to the rotational axis.

The method includes the step of turning in a first direction. The first direction may preferably be parallel to the rotational axis, also known as longitudinal turning. Said step is included in a first pass, which is defined as between going into cut and going out of cut. The first pass is not necessarily a movement of the first cutting element along a straight line.

When turning in the first direction, the first nose cutting edge is active. A machined surface is formed by the first nose cutting edge.

Preferably, the first cutting element comprises a first forward cutting edge and a first rearward cutting edge, wherein the first nose cutting edge separating and connecting the first forward cutting edge and the first rearward cutting edge, wherein when turning in the first direction the first forward cutting edge forms an acute first entering angle.

After or during going out of cut, the turning tool is moved such that the first nose cutting edge is moved away from the metal work piece and such that the second nose cutting edge is moved towards the metal work piece. During at least a portion of said movement, neither the first cutting element nor the second cutting element is active, i.e. no metal cutting by the first and second cutting elements during said movement.

Said movement of the turning tool may preferably be a linear movement, i.e. the turning tool is moved linearly.

Said movement of the turning tool is preferably in a direction perpendicular to the coupling axis and perpendicular to the rotational axis. Said movement is preferably in a direction which is perpendicular to or substantially perpendicular to the first top surface.

The method includes the step of turning in a second direction, i.e. moving the turning tool in a second direction. The second direction is in the opposite direction or substantially opposite to the first direction. For example, the first direction and second direction may be parallel to the rotational axis, but in opposite directions. Said step is included in a second pass, which is defined as between going into cut and going out of cut. The second pass is not necessarily a movement of the first cutting element along a straight line. A machined surface is formed by the second nose cutting edge. The second nose cutting edge and the second forward cutting edge is active, such that the second forward cutting edge is active at a second entering angle which is 5-45°, even more preferably 5-30°. The second cutting element is inactive when turning in the first direction. The first cutting element is inactive when turning in the second direction.

Preferably the method comprises the further step of setting the second rearward cutting edge to form an obtuse back clearance angle when turning in the second direction. Preferably, said back clearance angle is 91°-135°, even more preferably 93°-120°.

Preferably the method comprises the further step of setting the first rearward cutting edge to form a back clearance angle of at least 91° when turning in the first direction.

Preferably the method comprises the further step of turning at least a portion of a surface machined in the first pass when turning in the second direction.

Preferably the step of moving the turning tool such that the first nose cutting edge is moved away from the metal work piece and such that the second nose cutting edge is moved towards the metal work piece, is without rotation of the turning tool around the coupling center axis. Said step is preferably a linear movement of the turning tool, preferably along the Y-axis of the CNC-lathe. By this, the indexing time can be shorter, compared to a rotational movement.

Preferably, the turning tool does not rotate around the coupling axis during the first pass second pass or between the first and second passes. Preferably, the turning tool does not rotate around any other axis, such as any axis parallel to the coupling axis, during or between the first and second passes.

Preferably the method comprises the step of arranging the first and second nose cutting edges spaced apart along the rotational axis by a constant distance when turning in the first and second directions.

Preferably also during the step between the first and second passes.

Preferably, the method comprises the set of setting the coupling axis is perpendicular to the rotational axis.

Preferably the method comprises the step of clamping the metal work piece by clamping means, where the clamping means comprises a 3-jaw chuck.

Preferably, a distance from the clamping means to the second nose cutting edge is shorter than a distance from the clamping means to the first nose cutting edge.

Preferably, the second nose cutting edge is ahead of the first nose cutting edge when turning in the first direction.

Preferably, the first nose cutting edge is ahead of the second nose cutting edge when turning in the second direction. Ahead is to be understood as ahead in the feed direction, along the rotational axis.

Preferably the second pass is in a direction away from a corner. A corner, or a shoulder, is defined as the intersection between a first surface concentric with the rotational axis, and a second surface perpendicular to the rotational axis. The first surface may be an external surface or an internal surface, i.e. a surface inside a bore.

Preferably, the first surface is an external surface, i.e. a radially external surface.

According to an aspect of the invention, there is provided a computer program having instructions which when executed by a CNC-lathe causes the CNC-lathe to perform the steps according to any of the above described methods.

Said computer program, or computer program product, may be included in a CAM-software product, i.e. a software for computer-aided manufacturing. Said computer program may be in the form a computer readable medium such as a USB-stick, a CD-ROM or a data stream.

DESCRIPTION OF THE DRAWINGS

The present invention will now be explained in more detail by a description of embodiments of the invention and by reference to the accompanying drawings.

Figure 1:
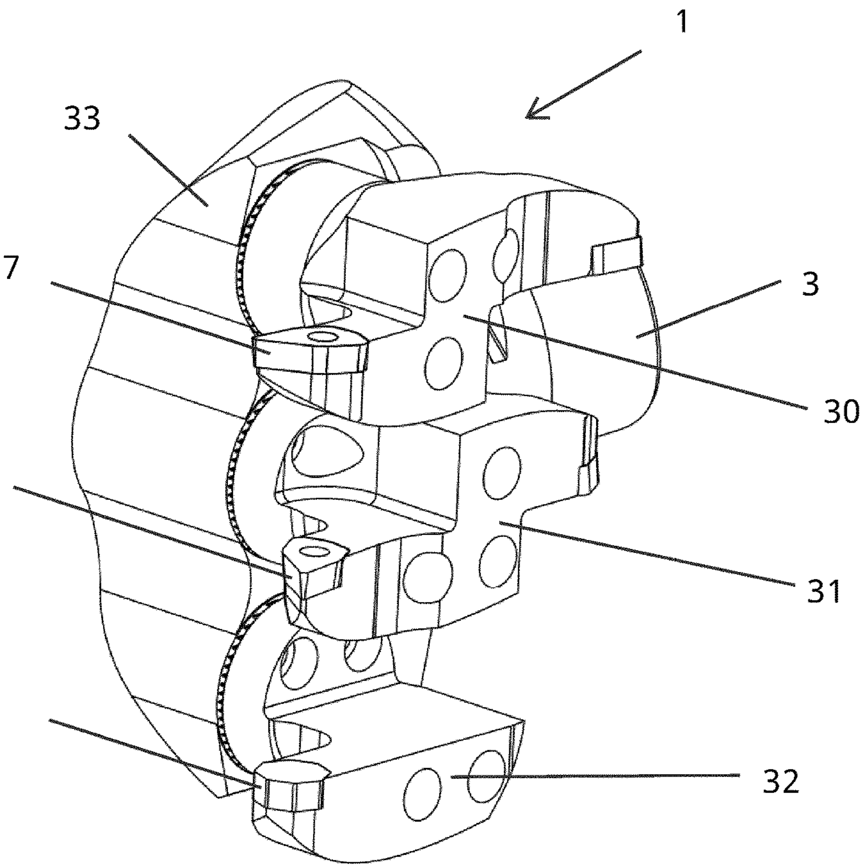
FIG. 1 is a perspective view of a turning tool according to an embodiment.
Figure 2:
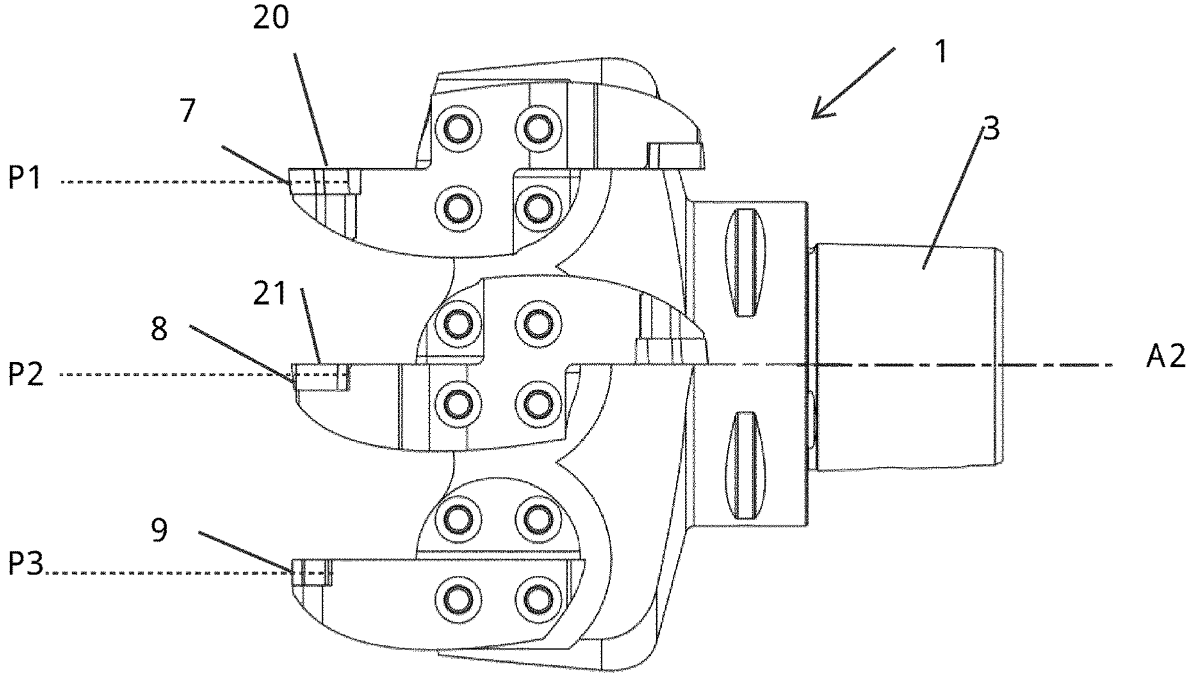
FIG. 2 is a side view of the turning tool in FIG. 1.

All turning tools in the figures are drawn to scale.

DETAILED DESCRIPTION OF EMBODIMENTS OF THE INVENTION

Reference is made to FIGS. 1-8 which show a turning tool 1 according to an embodiment. The turning tool 1 comprising a coupling portion 3. The coupling portion 3 extends along a coupling axis A2.

The coupling axis A2 defines a longitudinal axis of the turning tool 1. The coupling portion 3 comprises a conical or substantially conical portion. In the example, the substantially conical portion is according to what is in the industry is known as Coromant Capto®.

The coupling portion may have other shapes, such a shape which is square shaped or rectangular shaped in a cross section, where said cross section is perpendicular to the coupling axis.

The turning tool 1 comprises a first cutting element 7 in the form of a first turning insert 7, a second cutting element 8 in the form of a second turning insert 8, and a third cutting element 9 in the form of a third turning insert 9. The first turning insert 7 comprises a first cutting edge 5 in the form of a first nose cutting edge 5, a first forward cutting edge 12 and a first rearward cutting edge 14. The first nose cutting edge 5 separates and connects the first forward cutting edge 12 and the first rearward cutting edge 14. The first turning insert 7 comprises a first top surface 20 and an opposite first bottom surface. The second turning insert 8 comprises a second nose cutting edge 6, a second forward cutting edge 13 and a second rearward cutting edge 15. The second nose cutting edge 6 separating and connecting a second forward cutting edge 13 and a second rearward cutting edge 15. In other words, the second forward cutting edge 13 and a second rearward cutting edge 15 converge towards the second nose cutting edge 6. The second cutting element 8 comprises a second top surface 21 and an opposite second bottom surface.

A first mid-plane P1 extends mid-way or substantially mid-way between the first top surface 20 and the first bottom surface. The first mid-plane P1 is parallel to or substantially parallel to the first bottom surface. In a corresponding manner, the second turning insert 8 comprises a second top surface 21 and an opposite second bottom surface, wherein a second mid-plane P2 extends mid-way or substantially mid-way between the second top surface 21 and the second bottom surface. The third turning insert 9 is arranged in a corresponding manner, having a third mid-plane P3 mid-way between a top and a bottom surface thereof. Said top surfaces 20, 21 are suitable to function as rake surfaces. The first, second and third mid-planes P1, P2, P3 extends in parallel or substantially parallel planes. As seen in e.g. FIG. 2, the first top surface 20 and the second top surface 21 are facing in the same or substantially the same direction, which is upwards in FIG. 2.

Figure 3:
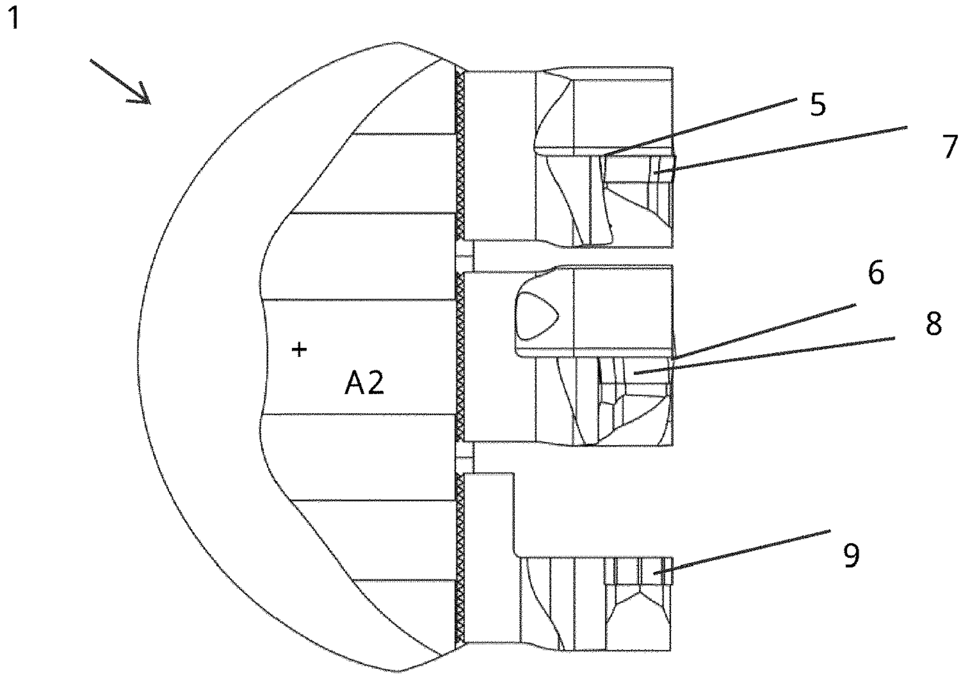
FIG. 3 is a front view of the turning tool in FIG. 1.
Figure 4:
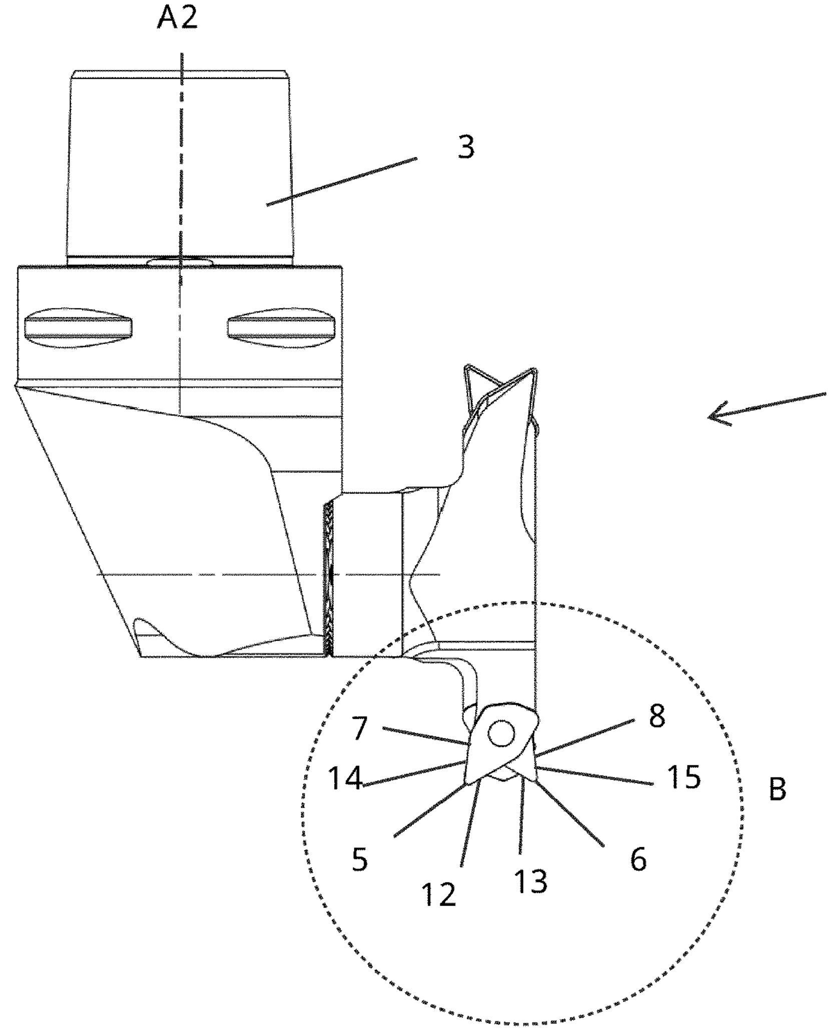
FIG. 4 is a top view of the turning tool in FIG. 1.
Figure 5:
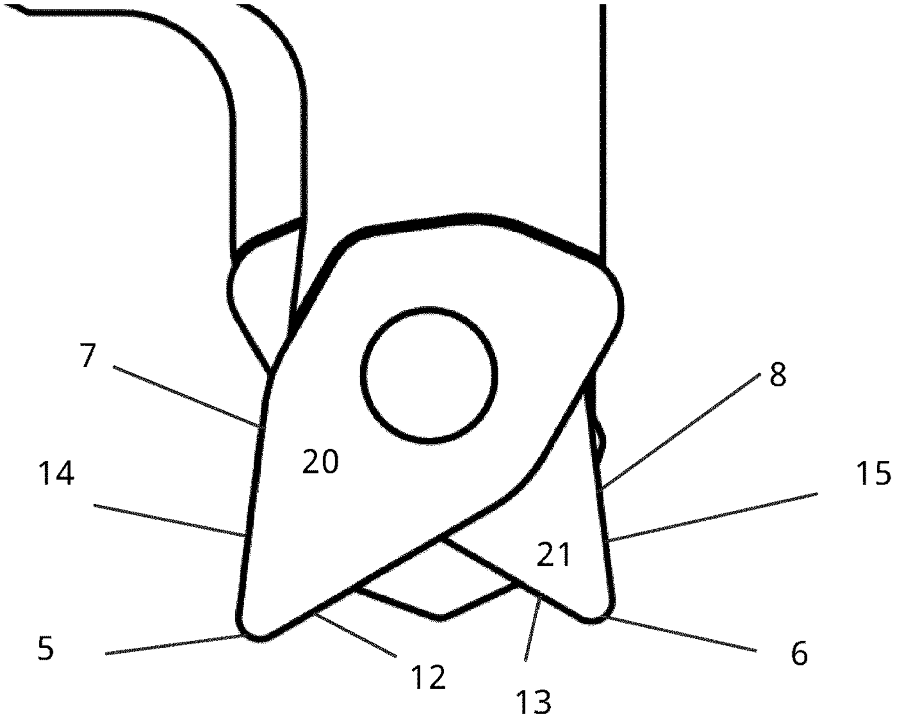
FIG. 5 is a magnified view of section B in FIG. 4.

As seen in FIG. 3, a distance from the coupling axis A2 to the sec- and nose cutting edge is greater than a distance from the coupling axis A2 to the first nose cutting edge 5. Said distances are measured horizontally in FIG. 3. In other words, said distance from a first plane comprising the coupling axis, wherein said first plane is perpendicular to the first mid-plane. Thus, said distances are from said first plane and to the first nose cutting edge 5 and to the second nose cutting edge 6. In a top view, as seen in FIG. 4 and in FIG. 5 is a magnified view of section B in FIG. 4, a first bisector between the first forward cutting edge 12 and the first rearward cutting edge 14 forms an angle of 45-90° in relation to a second bisector between the second forward cutting edge 13 and the second rearward cutting edge 15. It can also be seen that the first rearward cutting edge 14 and the second rearward cutting edge 15 forms an angle of 6-20° in relation to each other. Further, a distance from the first forward cutting edge 12 to the second forward cutting edge 13 is shorter than a distance from the first forward cutting edge 12 to the second rearward cutting edge 15. A first nose angle defined as an angle between the first forward cutting edge 12 and the first rearward cutting edge 14 is acute. A second nose angle defined as an angle between the second forward cutting edge 13 and the second rearward cutting edge 15 is acute. In e.g. FIG. 4 the first nose cutting edge 5 and the second nose cutting edge 6 are longitudinally at an equal or substantially equal distances. The first nose cutting edge 5 and/or the second nose cutting edge 6 is the longitudinally most distal part of the turning tool 1, where longitudinally is defined as along the coupling axis or along axii parallel to the coupling axis A2.

In FIG. 5 the first turning insert 7 and the second turning insert 8 partially overlap in a top view.

Figure 6:
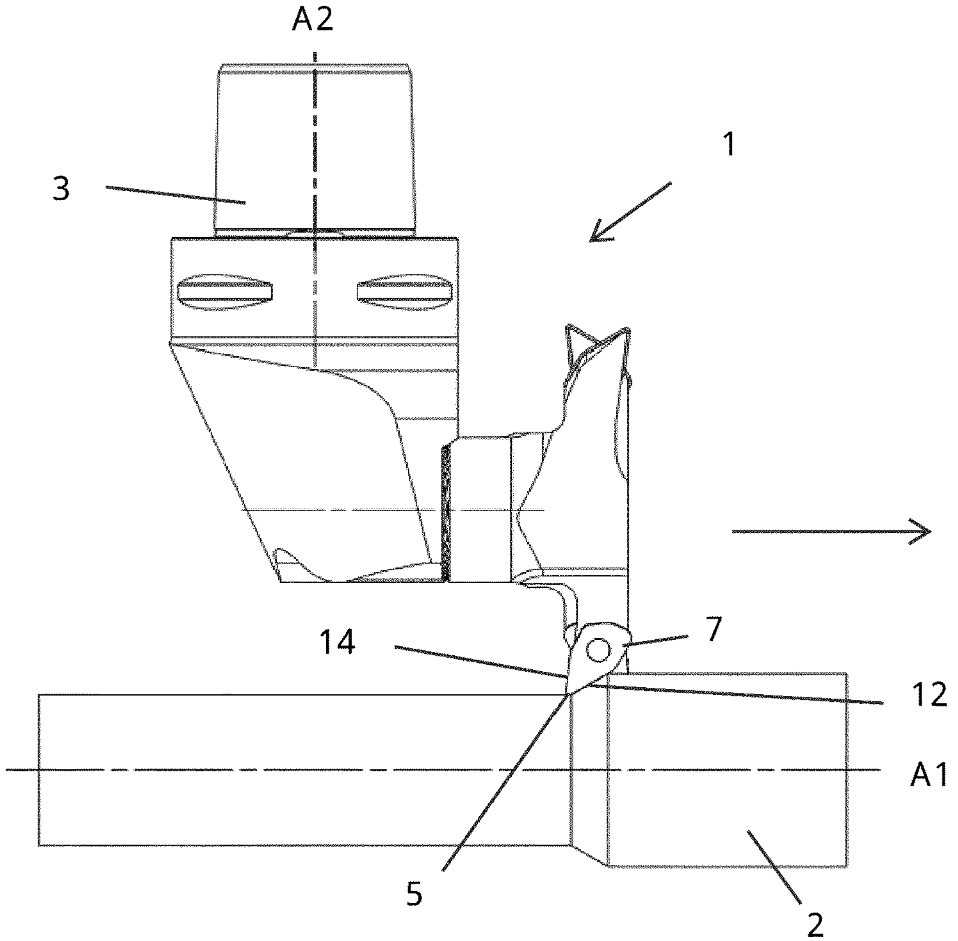
FIG. 6 is a top view of the turning tool in FIG. 1 and a metal work piece.

FIG. 6 show an example of a first step of a turning method for a CNC-lathe (not shown). A metal work piece 2 is rotating in one direction 50 around a rotational axis A1 thereof. The coupling portion 3 of the turning tool 1 is connected to the CNC-lathe (not shown), more specifically the coupling portion is connected to a machine interface. The coupling axis A2 is perpendicular to the rotational axis A1. The turning tool 1 is moved in a first direction 17 such that the first nose cutting edge 5 is in cut and such that the first forward cutting edge forms an acute entering angle. The first rearward cutting edge 14 forms an obtuse back clearance angle. The second and third turning inserts 8, 9 are spaced apart from the metal work piece 2. The second nose cutting edge is ahead of the first nose cutting edge 5 in the first direction 17. The first direction is parallel to the rotational axis A1.

Figure 7:
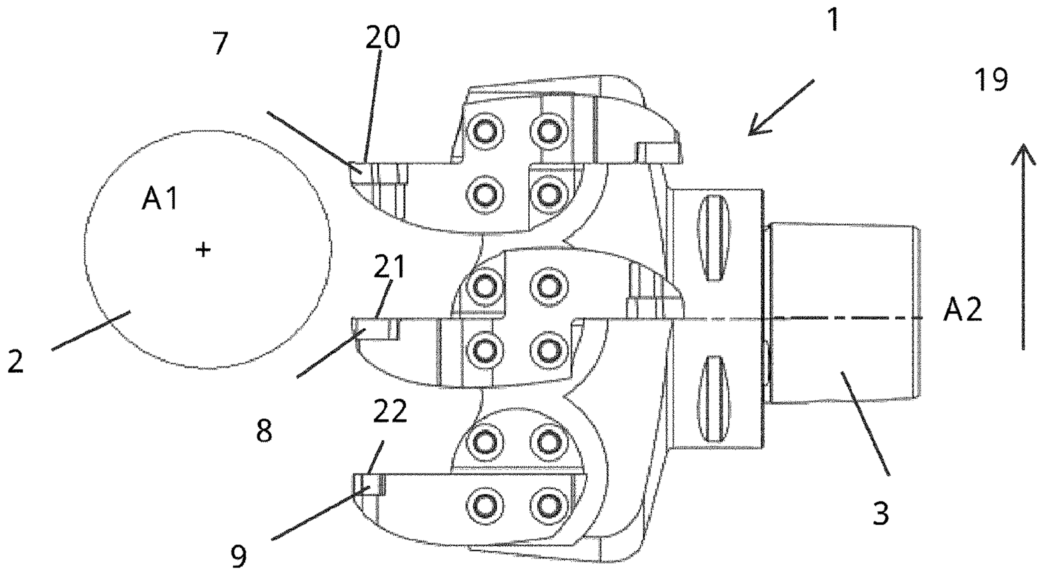
FIG. 7 is a side view of the turning tool in FIG. 1 and a metal work piece.

After the first step, the turning tool 1 is moved in a direction 19 perpendicular to the coupling axis A2 and perpendicular to the rotational axis A1, as seen in FIG. 7. Said direction 19 is in the same direction or substantially the same direction as the first top surface 20 is facing. Said direction 19 is along the Y-axis of the CNC-lathe (not shown) to which the turning tool 1 is connected. Said direction 19 is not radially in relation to the rotational axis A1 but rather tan-gential in relation to the metal work piece 2. Said movement of the turning tool 1 is a linear movement, where the first nose cutting edge is moved further away from the metal work piece 2 and such that the second nose cutting edge 6 is moved closer to or towards the metal work piece 2. None of the first, second or third cutting inserts 7, 8, 9 are in cut.

Figure 8:
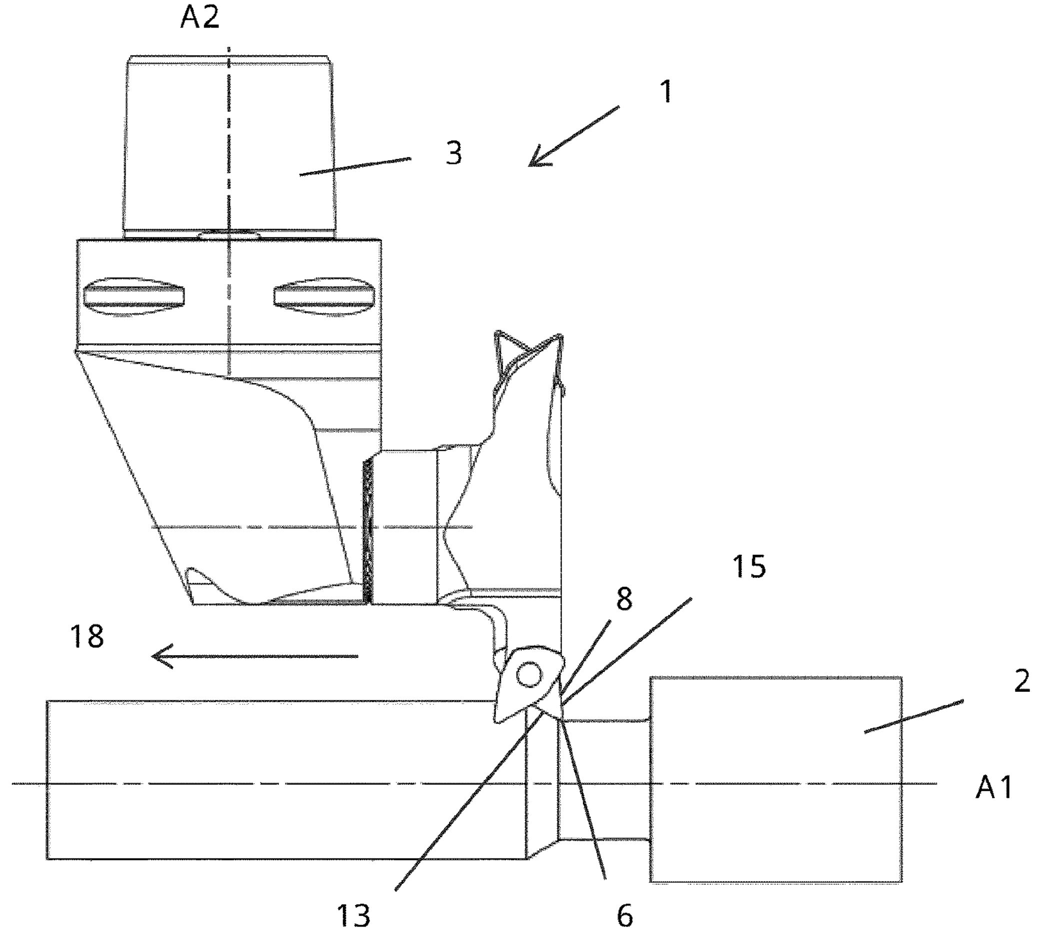
FIG. 8 is a top view of the turning tool in FIG. 1 and a metal work piece.

FIG. 8 show a further step, which is after the step shown in FIG. 7. The turning tool 1 moved in a second direction 18 such that the second forward cutting edge 13 is in cut at an acute second entering angle β which is 5-45°. A machined surface is formed by the second nose cutting edge 6. The second direction 18 is in the opposite direction or substantially opposite direction to the first direction 17. The second rearward cutting edge 15 forms an obtuse back clearance angle. The first nose cutting edge is ahead of the second nose cutting edge 6 in the second direction. The first and third turning inserts 7, 9 are spaced apart from the metal work piece 2. At least a portion of the machined surface resulting from the step shown in FIG. 6 is machined in the step shown in FIG. 8.

The metal work piece can have a different shape compared to what has been described above. The metal work piece may be in the form of a bar, a hollow bar or any other shape which has a rotational symmetry or substantially has a rotationally symmetry around a rotational axis thereof. The shape which can be machined can be of different configurations than what have been described above. For example, the shape can have not only one but two side walls, i.e.

surfaces which is in a plane perpendicular to the rotational axis. In other words, the turning tool can be used to machine an external groove.

Figure 9:
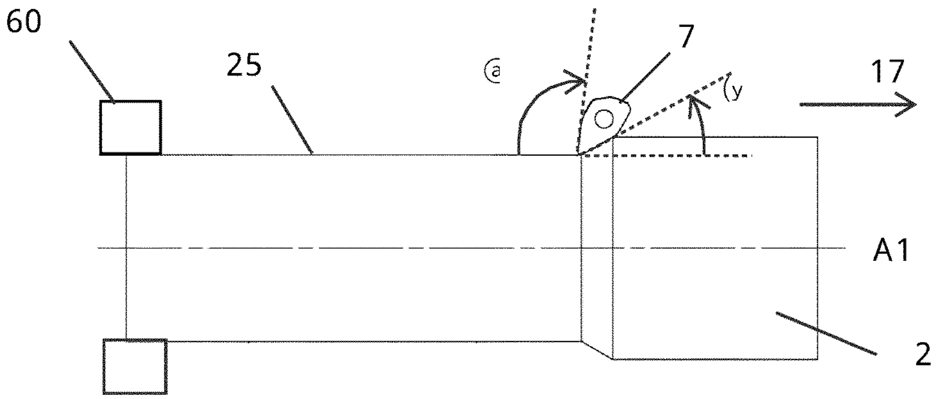
FIG. 9 is a schematic figure of moving a turning tool in a first direction.

FIG. 9 is a schematic figure of moving a turning tool in a first direction 17 where the first cutting element 7 is in cut. The first direction 17 is a feed direction. The first forward cutting edge forms a first entering angle α which is 5-45°, and the first rearward cutting edge forms an obtuse back clearance angle γ of at least 91°. The second cutting element 8 is spaced apart from the metal work piece 2. A machined surface 25 is formed by the first cutting element 7. More specifically, the surface 25 is formed by the first nose cutting edge 5.

Figure 10:
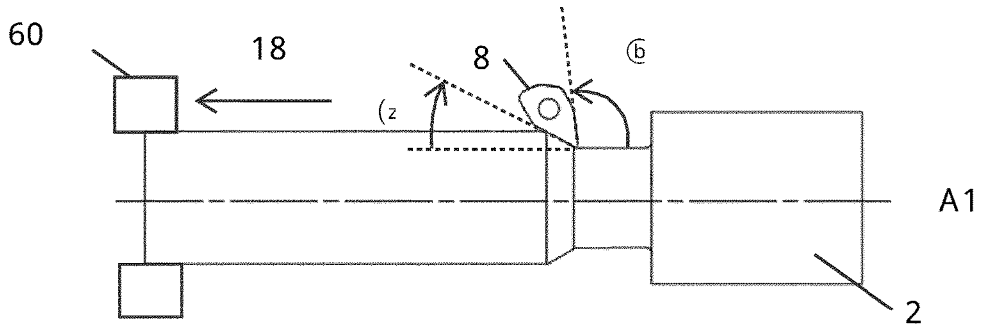
FIG. 10 is a schematic figure of moving a turning tool in a second direction.

FIG. 10 is a schematic figure of moving a turning tool in a second direction 18 where the second cutting element 8 is in cut. The second direction is a feed direction. The second forward cutting edge is in cut at a second entering angle β which is 5-45°, and the second rearward cutting edge forms an obtuse back clearance angle δ. At least a portion of a surface 25 machined when moving the turning tool 1 in the first direction 17, seen in FIG. 9, is machined by means of the second cutting element 8 in FIG. 10.

FIG. 9 show a first machining step, is followed by a step showed in FIG. 10. In FIG. 10, the second cutting element 8 is on the same side of the rotational axis A1 as the first cutting element 7 in FIG. 9, and the first top surface is facing the same direction as the second top surface.

The metal work piece 2 in FIGS. 24 and 25 is clamped by clamping means 60 at one end. Said clamping means 60 are connected to and driven by a rotating or rotatable spindle (not shown), which are part of a CNC-lathe (not shown). Said clamping means may be in the form of e.g. a collet chuck, a 3-jaw chuck or a face driver. A distance from the clamping means 60 to the second nose cutting edge 6 is shorter than a distance from the clamping means 60 to the first cutting edge 5, where said distances are measured along lines parallel to the rotational axis A1. In FIGS. 24 and 25, the first direction 17 is away from the clamping means 60, and the second direction 18 is towards the clamping means. Alternatively (not shown), the first direction 17 is towards the clamping means 60, and the second direction 18 is away from the clamping means. The first and second directions 17, 18 are thus in opposite directions along the rotational axis A1. Opposite directions can thus be understood as towards or away from the clamping means or towards or away from one longitudinal end of the metal work piece 2. The first and second directions 17, 18 are thus not necessarily linear and parallel to the rotational axis A1.

Figure 11:
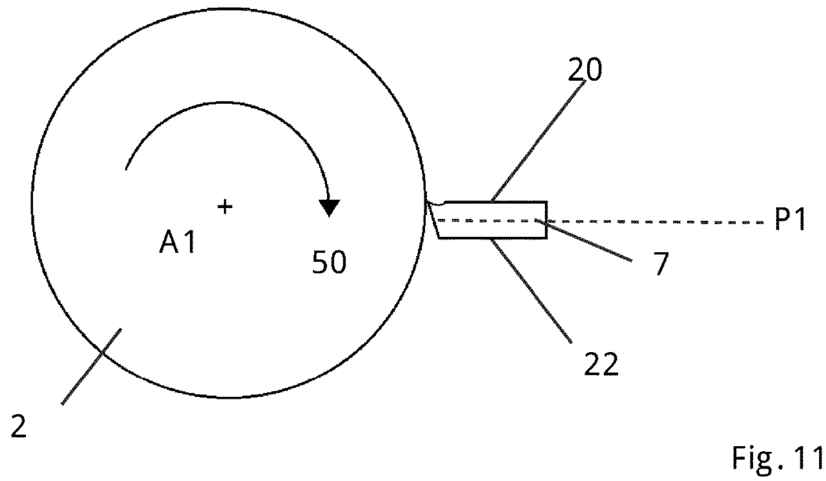
FIG. 11 is a schematic figure showing a first cutting element and a rotating metal work piece in a cross section.

FIG. 11 is a schematic figure showing a first cutting element 7 in the form of a first turning insert 7 and a rotating metal work piece 2 in a cross section. The first turning insert 7 comprises a first top surface 20 and a first bottom surface 22, both are horizontal or substantially horizontal. A first mid plane P1 is mid-way or substantially mid-way between the first top surface 20 and the first bottom surface 22. The first mid-plane P1 is parallel to or substantially parallel to the first bottom surface 22. The metal work piece 2 rotates in one direction 50 around a rotational axis A1 thereof. The first top surface 20 is facing upwards in the figure. When the first turning insert 7 is in cut, the second turning insert (not shown) is spaced apart from the metal work piece 2.

FIG. 10 show how the second direction 18 is in a direction away from a corner of the metal work piece 2. In other words, the second direction 18 is in a direction away from a surface which is in a plane perpendicular to the rotational axis A1. Said corner, or a shoulder, is the intersection between a surface concentric with the rotational axis, and a second surface perpendicular to the rotational axis. Said corner is a 90° corner. Said corner is preferably completely formed by the second cutting element, where the turning tool is moved towards the rotational axis A1, immediately prior to moving the turning tool in the second direction 18.

The first and second turning inserts 7, 8 described in the embodiments above are preferably made from a wear resistant material, preferably cemented carbide. The first and second top surfaces 20, 21 preferably comprises chip forming means or chip breaking means (not shown). Preferably, a distance from at least a portion of said chip forming means or chip breaking means to the mid-plane of the respective turning insert is greater than a distance from the cutting edge bordering to the top surface to said mid-plane. In other words, the top surfaces 20, 21 of the first and second turning inserts comprises at least one protrusion, which in a side view is higher than or above the cutting edge. In such a way, the turning inserts are more suitable for turning.

The first and second turning inserts 7, 8 described in the embodiments above are preferably designed such that the first forward cutting edge 12 is sloping downwards, i.e. towards the first bottom surface 22, at increasing distance from the first nose cutting edge 5. The second forward cutting edge 13 is preferably arranged in a corresponding manner. In such a way, the chip control is further improved.

The forward and rearward cutting edges are forward and rearward in the respective feed directions, not necessarily forward or rearward in relation to forward or rearward directions of the turning tool itself.

The invention claimed is:

1. A turning tool comprising:

a coupling portion, wherein the coupling portion extends along a coupling axis, the coupling axis defining a longitudinal axis of the turning tool; and a first cutting element and a second cutting element, wherein the first cutting element includes a first cutting edge, wherein the second cutting element includes a second nose cutting edge separating and connecting a second forward cutting edge and a second rearward cutting edge, wherein the first cutting element includes a first top surface, wherein the second cutting element includes a second top surface, and wherein the first top surface and the second top surface are facing in a same or substantially the same direction, wherein the first cutting element includes a first forward cutting edge and a first rearward cutting edge, wherein the first cutting edge is in the form of a first nose cutting edge, and wherein the first nose cutting edge separates and connects the first forward cutting edge and the first rearward cutting edge, wherein in a top view, a first bisector between the first forward cutting edge and the first rearward cutting edge forms an angle of 45-90° in relation to a second bisector between the second forward cutting edge and the second rearward cutting edge, wherein the first cutting element is arranged such that when turning in a first direction perpendicular to the coupling axis, the first forward cutting edge forms a first entering angle of 3-45°, and wherein the second cutting element is arranged such that when turning in a second direction, opposite to the first direction and perpendicular to the coupling axis, the second forward cutting edge forms a second entering angle of 3-45°.

2. The turning tool according to claim 1, wherein in the top view, the first rearward cutting edge and the second rearward cutting edge forms an angle of 6-20° in relation to each other.

3. The turning tool according to claim 1, wherein a distance from the first forward cutting edge to the second forward cutting edge is shorter than a distance from the first forward cutting edge to the second rearward cutting edge.

4. The turning tool according to claim 1, wherein a first nose angle, defined as an angle between the first forward cutting edge and the first rearward cutting edge, is acute.

5. The turning tool according to claim 1, wherein a second nose angle, defined as an angle between the second forward cutting edge and the second rearward cutting edge, is acute.

6. The turning tool according to claim 1, wherein the first nose cutting edge and the second nose cutting edge are longitudinally at equal or substantially equal distances.

7. The turning tool according to claim 1, wherein the first nose cutting edge and/or the second nose cutting edge is a longitudinally most distal part of the turning tool.

8. The turning tool according to claim 1, wherein the first cutting element is in the form of a first turning insert, wherein the second cutting element is in the form of a second turning insert, wherein the first turning insert includes the first nose cutting edge, wherein the second turning insert includes the second nose cutting edge, the second forward cutting edge and the second rearward cutting edge.

9. The turning tool according to claim 8, wherein a first mid-plane extends substantially mid-way between the first top surface and the first bottom surface, wherein the second turning insert includes a second top surface and an opposite second bottom surface, wherein a second mid-plane extends substantially mid-way between the second top surface and the second bottom surface, and wherein the first mid-plane and the second mid-plane extends in parallel or substantially parallel planes.

10. The turning tool according to claim 8, wherein in a top view, the first turning insert and the second turning insert partially overlap.

11. The turning tool according to claim 1, wherein the turning tool includes a third cutting element.

12. The turning tool according to claim 1, wherein the coupling portion is square or rectangular in a cross section or includes a conical or substantially conical portion.

13. A turning method for a CNC-lathe, comprising the steps of:

providing a metal work piece;

providing a turning tool according to claim 1;

rotating the metal work piece in one direction around a rotational axis thereof;

turning in a first direction such that the first nose cutting edge is in cut;

moving the turning tool in a direction such that the first nose cutting edge is moved away from the metal work piece and such that the second nose cutting edge is moved towards the metal work piece; and moving the turning tool in a second direction such that the second forward cutting edge is active at a second entering angle (β) which is 5-45°, wherein the second direction is in the opposite direction or substantially opposite direction to the first direction.

14. A computer program having instructions, which when executed by a CNC-lathe, causes the CNC-lathe to perform the steps according to claim 13.

15. The method of claim 13, wherein the turning tool is moved in a first direction such that the first forward cutting edge is in cut at a first entering angle of 3-45°.

* * * * *